United States Patent
Rahamathjan et al.

(10) Patent No.: US 11,449,286 B1
(45) Date of Patent: Sep. 20, 2022

(54) METHOD AND APPARATUS GENERATE DISPLAY MIRROR IMAGE OF USER INTERFACE AND TO PRINT DOCUMENTS IN A THIRD-PARTY APPLICATION FROM A MULTI-FUNCTION DEVICE

(71) Applicant: Xerox Corporation, Norwalk, CT (US)

(72) Inventors: Suhail Sheriff Rahamathjan, Chennai (IN); Mohan Paramanantham, Namakkal (IN)

(73) Assignee: Xerox Corporation, Norwalk, CT (US)

( * ) Notice: Subject to any disclaimer, the term of this patent is extended or adjusted under 35 U.S.C. 154(b) by 0 days.

(21) Appl. No.: 17/379,946

(22) Filed: Jul. 19, 2021

(51) Int. Cl.
*G06F 3/12* (2006.01)
*H04N 1/00* (2006.01)

(52) U.S. Cl.
CPC .......... *G06F 3/1222* (2013.01); *G06F 3/1236* (2013.01); *G06F 3/1238* (2013.01); *G06F 3/1253* (2013.01); *G06F 3/1271* (2013.01); *H04N 1/00851* (2013.01)

(58) Field of Classification Search
None
See application file for complete search history.

(56) References Cited

U.S. PATENT DOCUMENTS

| | | | |
|---|---|---|---|
| 10,033,531 B2 | 7/2018 | Tse | |
| 10,129,743 B2 | 11/2018 | Bortnem et al. | |
| 2012/0154852 A1* | 6/2012 | Hedberg | G06F 3/1287 358/1.15 |
| 2013/0077124 A1* | 3/2013 | Vojak | H04N 1/444 358/1.14 |
| 2014/0126018 A1* | 5/2014 | Sugimoto | H04N 1/00251 358/1.15 |
| 2014/0226171 A1* | 8/2014 | Tredoux | G06F 3/1236 358/1.13 |
| 2014/0226173 A1* | 8/2014 | Tredoux | H04W 12/30 358/1.14 |
| 2015/0036171 A1* | 2/2015 | Harano | G06K 15/408 358/1.14 |
| 2015/0339561 A1* | 11/2015 | Takenaka | G06F 3/1222 358/1.14 |
| 2017/0187658 A1* | 6/2017 | Ryu | G06F 3/04817 |

* cited by examiner

Primary Examiner — Haris Sabah

(57) ABSTRACT

A method is disclosed. For example, the method includes executing an application associated with a third-party application being executed on a mobile device, displaying a computer-readable code on a user interface shown on a display of a multi-function device (MFD), wherein the computer-readable code is to be scanned by the mobile device and provide connection information to the mobile device, receiving a connection request from the mobile device with the connection information contained in the computer-readable code scanned by the mobile device, establishing a connection to the mobile device, receiving third-party application information from the third-party application being executed on the mobile device, displaying the third-party application information on the user interface of the MFD, wherein the third-party application information includes a document, receiving a selection of the document to be printed from the third-party application information displayed on the user interface of the MFD, and printing the document.

13 Claims, 5 Drawing Sheets

METHOD AND APPARATUS GENERATE DISPLAY MIRROR IMAGE OF USER INTERFACE AND TO PRINT DOCUMENTS IN A THIRD-PARTY APPLICATION FROM A MULTI-FUNCTION DEVICE

The present disclosure relates generally to multi-function devices, and relates more particularly to a method and apparatus to print documents in a third-party application from a multi-function device.

BACKGROUND

Mobile devices, such as smart phones, tablet computers, laptops, and the like, can execute third-party applications. These third-party applications allow some individuals to exchange messages and include documents within the messages. Some enterprises may allow employees to use some third-party applications to improve productivity and share documents.

SUMMARY

According to aspects illustrated herein, there are provided a method, a non-transitory computer readable medium, and apparatus for printing a document in a third-party application from an MFD. One disclosed feature of the embodiments is a method that comprises executing an application associated with a third-party application being executed on a mobile device, displaying a computer-readable code on a user interface shown on a display of the MFD, wherein the computer-readable code is to be scanned by the mobile device and provide connection information to the mobile device, receiving a connection request from the mobile device with the connection information contained in the computer-readable code scanned by the mobile device, establishing a connection to the mobile device, receiving third-party application information from the third-party application being executed on the mobile device, displaying the third-party application information on the user interface of the MFD, wherein the third-party application information includes a document, receiving a selection of the document to be printed from the third-party application information displayed on the user interface of the MFD, and printing the document.

Another disclosed feature is an MFD for printing a document in a third-party application from the MFD. The MFD includes a processor and a non-transitory computer readable medium storing instructions that are executed by the processor to perform operations comprising executing an application associated with a third-party application being executed on a mobile device, displaying a computer-readable code on a user interface shown on a display of the MFD, wherein the computer-readable code is to be scanned by the mobile device and provide connection information to the mobile device, receiving a connection request from the mobile device with the connection information contained in the computer-readable code scanned by the mobile device, establishing a connection to the mobile device, receiving third-party application information from the third-party application being executed on the mobile device, displaying the third-party application information on the user interface of the MFD, wherein the third-party application information includes a document, receiving a selection of the document to be printed from the third-party application information displayed on the user interface of the MFD, and printing the document.

Another disclosed feature of the embodiments is a non-transitory computer-readable medium having stored thereon a plurality of instructions, the plurality of instructions including instructions which, when executed by a processor, cause the processor to perform operations comprising executing an application associated with a third-party application being executed on a mobile device, displaying a computer-readable code on a user interface shown on a display of the MFD, wherein the computer-readable code is to be scanned by the mobile device and provide connection information to the mobile device, receiving a connection request from the mobile device with the connection information contained in the computer-readable code scanned by the mobile device, establishing a connection to the mobile device, receiving third-party application information from the third-party application being executed on the mobile device, displaying the third-party application information on the user interface of the MFD, wherein the third-party application information includes a document, receiving a selection of the document to be printed from the third-party application information displayed on the user interface of the MFD, and printing the document.

BRIEF DESCRIPTION OF THE DRAWINGS

The teaching of the present disclosure can be readily understood by considering the following detailed description in conjunction with the accompanying drawings, in which.

To facilitate understanding, identical reference numerals have been used, where possible, to designate identical elements that are common to the figures.

DETAILED DESCRIPTION

Figure 1:
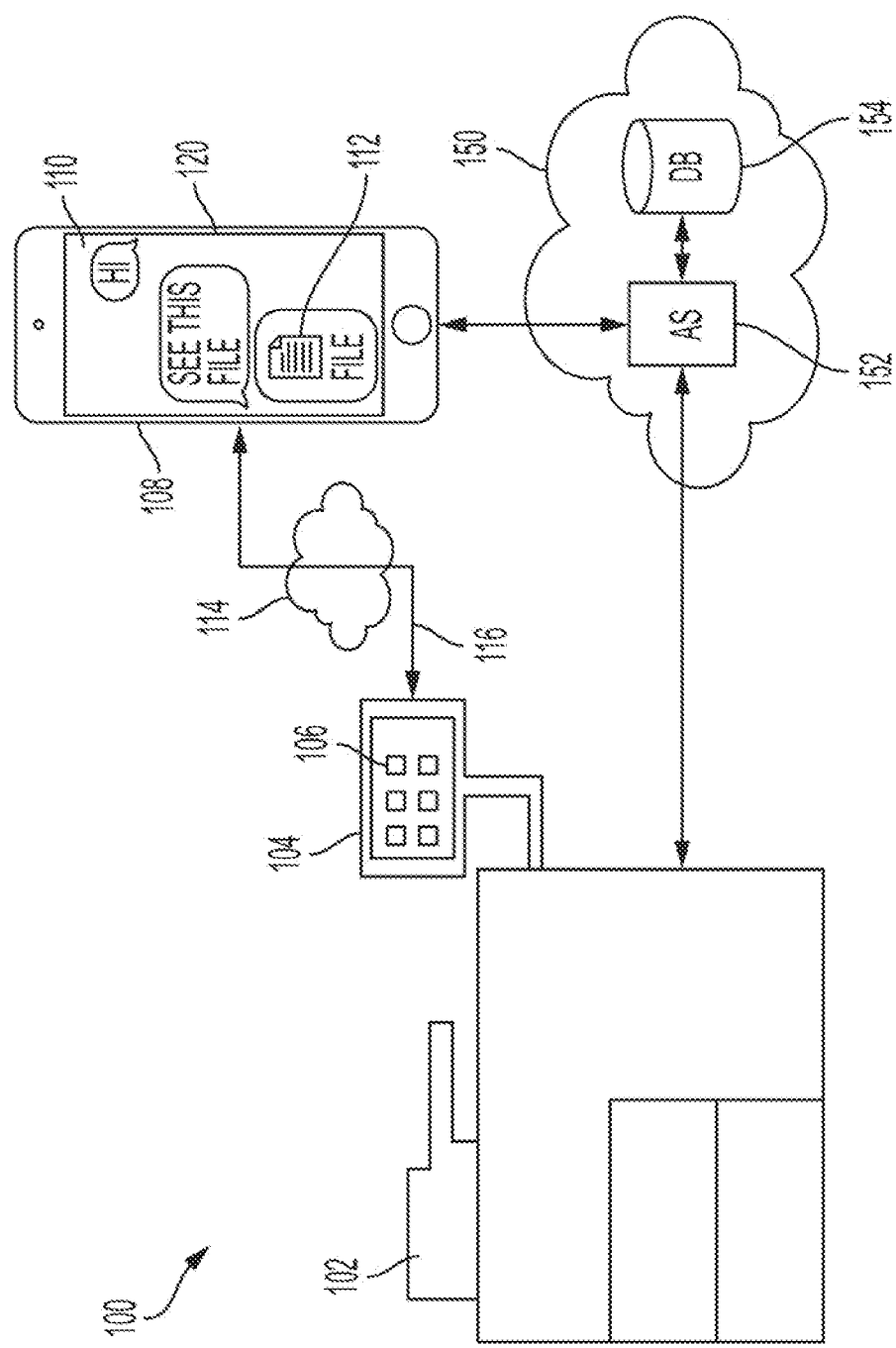
FIG. 1 illustrates a block diagram of an example network of the present disclosure.

The present disclosure broadly discloses a method and apparatus to print documents in a third-party application from a multi-function device (MFD). As discussed above, mobile devices, such as smart phones, tablet computers, laptops, and the like, can execute third-party applications. These third-party applications allow some individuals to exchange messages and include documents within the messages. Some enterprises may allow employees to use some third-party applications to improve productivity and share documents.

Currently, there are limited and ineffective options when a user wants to print a document from a third-party application. One option may be for the user to email the document to him or herself, then use a computer that is connected to a printer to download the emailed document and print the document. Another option may be to find a printer that is compatible with the mobile device. However, not all printers are compatible with mobile devices. In addition, those printers that are compatible with mobile devices may not have the desired printing quality and/or capability of full sized multi-function devices.

Another option may be to connect the mobile device to a printer via a physical cable (e.g., a universal serial bus (USB) cable). Connecting to a printer via a physical cable may cause the files to be corrupted as the file is transferred and then printed. Yet another option may be to log into the third-party application from a web browser on a computing device connected to a printer, download the document from the web browser version of the third-party application, and then print the document from the computing device.

However, the available options described above may all be time consuming and may require additional steps and/or hardware. In addition, some of the options described above may increase security threats in networking.

Embodiments of the present disclosure provide a more efficient and more secure way to print documents from third-party applications directly from the user interface of an MFD. A single connection between the mobile device executing the third-party application may be established between the MFD and the mobile device, thereby reducing potential security threats over multiple connections across several networks.

In addition, the present disclosure may use applications written for the MFD that may generate a computer readable code that can provide instructions to allow the mobile device to automatically connect with the MFD. The computer readable code may also include instructions to allow the mobile device to provide log in information to the third-party application to allow the user to be logged into the third-party application written for the MFD.

In one embodiment, after the connection is established, the third-party application executed on the MFD may present a mirrored copy of the third-party application executed on the mobile device of the user. As a result, a user may navigate through the third-party application on the user interface of the MFD to locate the desired documents. The user may select the document from the user interface of the MFD and then print the document directly from the third-party application on the user interface of the MFD. As a result, the present disclosure provides an efficient way to connect a mobile device to an MFD and print a document from the third-party application from the user interface of the MFD.

FIG. 1 illustrates an example network 100 of the present disclosure. In an example, the network 100 may include a multi-function device (MFD) 102 and a mobile device 108. In an example, the MFD 102 may be an electronic device that may include print, copy, fax, and scan capabilities. In one embodiment, the MFD 102 may include a display 104 that provides a user interface 106 for the MFD 102. The display 104 may be a touch screen display that allows for user interaction with the user interface 106 via touch commands. However, the user interface 106 may also include a physical input device located on the MFD 102, such as a physical keypad or keyboard with physical buttons, a touch pad, and the like.

In one embodiment, various applications may be written for the MFD 102 and selected for execution via the user interface 106. The applications may be written specifically for use on multi-function devices. For example, the applications may be written using an extensible interface platform (EIP).

The MFD 102 illustrated in FIG. 1 has been simplified for ease of explanation, but may contain additional components and/or capabilities that are not shown. For example, the MFD 102 may include a processor and a computer-readable medium. The computer-readable medium may store instructions that are executed by the processor to perform the functions described herein.

The MFD 102 may also include communication interfaces (e.g., a wireless network interface, a WiFi radio, a Bluetooth radio, an Ethernet port, and the like) to establish a wired or wireless communication session with the mobile device 108 and/or other networks illustrated in FIG. 1 (e.g., a wireless network 114, an Internet protocol (IP) network 150, and the like). The MFD 102 may also include other components, such as a paper tray, an optical scanner to scan documents, printheads to print images, a digital front end to process print requests, and the like.

In one embodiment, the mobile device 108 may be a portable electronic device with a processor and memory that operates primarily on a battery power source. In other words, the mobile device 108 does not use a power source drawn from being plugged into a wall outlet. Examples of the mobile device 108 may include a mobile telephone, a smart phone, a laptop computer, a tablet computer, and the like.

In one embodiment, the mobile device 108 may be able to execute third-party applications that are stored in memory and executed by the processor of the mobile device 108. The mobile device 108 may include communication interfaces (e.g., a wireless network interface, a WiFi radio, a Bluetooth radio, an Ethernet port, and the like) to establish a wireless or wired communication session with other networks illustrated in FIG. 1 (e.g., the wireless network 114, the IP network 150, and the like).

In one embodiment, third-party applications may be applications that are downloaded from external sources into the memory of the mobile device 108 and executed by the processor of the mobile device 108. For example, a third-party application may be an application purchased or downloaded from an application store hosted by a manufacturer of the mobile device 108. In another example, the third-party application may be an application that is downloaded from a website hosted by a server of a developer of the third-party application. For example, a user may access a web page via a web browser executed on the mobile device 108 and download the third-party application from the web page.

In one embodiment, the third-party applications may be applications that also allow for the exchange of document files that can be printed. For example, the third-party applications may include a chat or messaging application or an application that includes a chat or messaging function within the application (e.g., a social media application that may include a chat or messaging option within the social media application). Users may communicate with one another via a chat window in which users may transmit documents and/or files within the chat window.

FIG. 1 illustrates an example of a user interface 110 of a third-party application shown on a display 120 of the mobile device 108. The display 120 may be a touch screen display and may allow users to interact with the user interface 110 using touch commands (e.g., swipe, scroll, pinching, pressing, and the like). The user interface 110 illustrates an example of a document 112 and a few messages exchanged between users. The document 112 may be any type of file that can be printed. For example, the document 112 may include text, images, or a combination of text and images.

In one embodiment, the third-party application may be hosted by an application server (AS) 152 located in the IP network 150. The mobile device 108 may establish a communication session with the AS 152 to use the third-party application. For example, the user may log into the AS 152 via the third-party application with his or her user credentials (e.g., a username and password).

In an example, the IP network 150 may also include a database (DB) 154. The DB 154 may store user accounts, documents 112 that are exchanged via the third-party application, and the like. The AS 152 may be communicatively coupled to the DB 154 to access the information stored in the DB 154. Although illustrated as two separate devices, it should be noted that the AS 152 and the DB 154 may be deployed as a single device or as multiple application servers and databases.

As noted above, the current methods to print the document 112 may be inefficient and/or create security threats through multiple connections to a printer. The embodiments of the present disclosure provide an efficient method to establish a single wireless connection 116 over the wireless network 114. The MFD 102 may include an application that is associated with the third-party application executed on the mobile device 108. The application on the MFD 102 may provide a computer-readable code that can be read by the mobile device 108 to automatically establish the wireless connection 116. The application on the MFD 102 may then mirror the user interface 110 of the third-party application on the mobile device 108. A user may then select the document 112 from the user interface 106 of the MFD 102 and print the document 112 directly from the MFD 102.

In one embodiment, the application on the MFD 102 may be written in the EIP language for the MFD 102. In one embodiment, the application for the MFD 102 may be written by the developer of the third-party application. For example, the MFD 102 may connect to the AS 152 and download the application associated with the third-party application from the DB 154.

The application on the MFD 102 associated with the third-party application may include instructions that process data associated with the third-party application received from the mobile device 108 to be compatible with the MFD 102, as discussed in further details below. For example, the application on the MFD 102 may convert data associated with the user interface 110 to be compatible with the user interface 106 on the display 104 of the MFD 102. For example, available commands may be mapped to the available inputs of the user interface 106, dimensions of the graphics or icons in the user interface 110 may be converted from the dimensions and/or resolution of the display 120 of the mobile device 108 to the dimensions and/or resolution of the display 104 of the MFD 102, and the like.

In one embodiment, the wireless network 114 may be a local wireless network or a short range wireless network. For example, the wireless network 114 may be a WiFi network associated with a location of the MFD 102. In one embodiment, the wireless network 114 may be a short range personal network (e.g., a Bluetooth connection).

Figure 2:
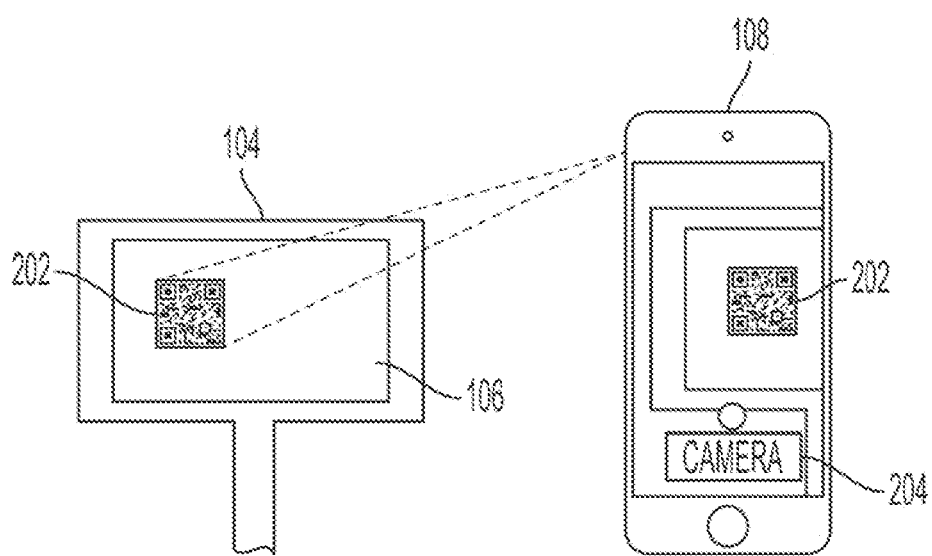
FIG. 2 illustrates an example interaction between a mobile device and an MFD to establish a wireless connection of the present disclosure.

FIG. 2 illustrates an example of interaction between the mobile device 108 and the MFD 102 to establish the single wireless connection 116 of the present disclosure. In one embodiment, a user may select the application via the user interface 106 of the MFD 102 that is associated with the third-party application being executed on the mobile device 108. When the application is selected on the MFD 102, the application may begin by generating a computer-readable code 202 that is shown on the display 104 of the MFD 102. The computer-readable code 202 may be a quick-response (QR) code, a bar code, or any other type of symbol that may contain information to establish the wireless connection 116.

In one embodiment, the mobile device 108 may include a camera 204. The camera 204 may capture an image of the computer-readable code 202. The mobile device 108 may include a computer-readable code reading application that can translate the information contained in the computer-readable code 202.

In one embodiment, the computer-readable code 202 may contain connection information for the mobile device 108 to establish the wireless connection 116 with the MFD 102. In one embodiment, the connection information may include a wireless connection identifier used by the MFD 102 and a security password. For example, the wireless connection identifier may be a name of the WiFi network that is used by the MFD 102 and a password associated with the WiFi network. In another example, the wireless connection identifier may indicate a name of the Bluetooth connection and a password for the Bluetooth connection.

In one embodiment, the connection information may include configuration information. For example, the connection information may indicate a particular port range to assign to the wireless connection 116, one or more security settings to adjust on the mobile device 108, and the like. Thus, when the mobile device 108 processes the computer-readable code 202 that is captured, the computer-readable code 202 may cause the mobile device 108 to execute various instructions to establish the wireless connection 116 automatically. In other words, the user may simply open the camera application on the mobile device 108, capture an image of the computer-readable code 202, and the mobile device 108 may automatically connect to the MFD 102 using the connection information obtained from the computer-readable code 202.

After the wireless connection 116 is established, the mobile device 108 may transmit third-party application information to the MFD 102. The third-party application information may be received by the MFD 102 and used to generate a mirror image of the user interface 110 on the user interface 106 of the MFD 102, as shown in FIG. 3.

Figure 3:
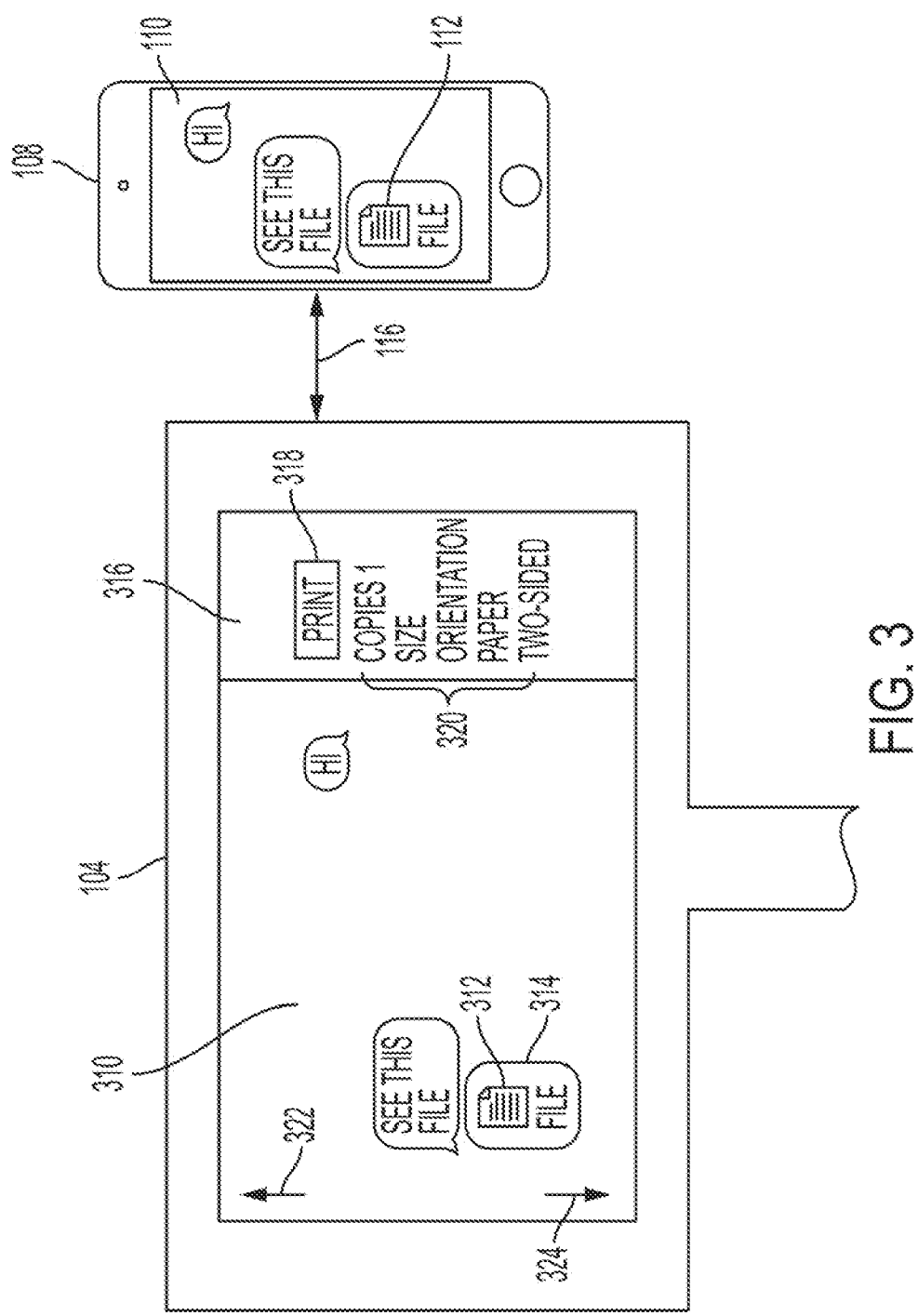
FIG. 3 illustrates an example screenshot of an example mirror image of the user interface of the third-party application executed on a mobile device that is shown on a display of the MFD.

FIG. 3 illustrates an example screenshot of an example mirror image 310 of the user interface 110 of the third-party application executed on a mobile device 108 that is shown on the display 104 of the MFD 102. In one embodiment, the third-party application information from the mobile device 108 may include data and/or information associated with the user interface 110 and/or additional.

In one embodiment, the mirror image 310 may copy what is shown in the user interface 110 of the third-party application being executed by the mobile device 108. The mirror image 310 may also include a user interface 316 that includes a print button 318 and print parameters 320. A user may select a document 312 that is a mirror image of the document 112 to be printed directly from the MFD 102. When the document 312 is selected, the document 312 may be highlighted via a box 314, or some other visual indication, to allow the user to confirm that the desired document 312 in the mirror image 310 was properly selected.

After the document 312 is selected, the user may modify one or more print parameters 320 directly on the user interface 316. The print parameters 320 may include parameters such as a number of copies, a size (e.g., enlarging or shrinking the image), an orientation, a type or size of paper, whether the print should be two-sided, and the like. After the print parameters 320 are selected, the user may select the print button 318 to print the document 312.

In one embodiment, the mirror image 310 may be sized differently or modified by the application executed on the MFD 102 to adjust for a different size of the display 104 compared to the display 120 of the mobile device 108, a different resolution of the display 104 compared to the display 120, different input capabilities between the user interface 106 and the user interface 110, and the like. However, the mirror image 310 may show the identical content that is currently shown in the user interface 110 on the display 120 of the mobile device 108. For example, the mirror image 310 may appear to the user as if the user is interacting with the user interface 110 that is shown on the display 120 of the mobile device 108. The mirror image 310 may have the same icons, color scheme, content, and the like that is shown in the user interface 110.

In one embodiment, the mirror image 310 may mask or delete text from the messages exchanged in the third-party application for privacy. For example, the display 104 on the MFD 102 may be on a public floor of an office building that can be easily seen by other users who may walk by. To prevent others from reading personal messages within the third-party application, the application executed by the MFD 102 may remove text in the text bubbles or other message indicators. Thus, the mirror image 310 may include blank text bubbles and only include the documents 314 that can be selected for printing.

In one embodiment, the mobile device 108 may transmit information and/or data associated with the user interface 110 of the third-party application to the MFD 102 to allow the MFD 102 generate the mirror image 310. In one embodiment, the information may include information associated with content within the user interface 110, a resolution and size of the display 120 of the mobile device 108, a size of icons or graphics in the user interface 110, a color of icons or graphics in the user interface 110, available commands to navigate the user interface 110, data associated with the document 112 in the user interface 110, and the like.

In one embodiment, as the user navigates the mirror image 310, the navigation commands may be shown on the user interface 110 on the mobile device 108. For example, the user may scroll up (e.g., the direction of the arrow 322) on the mirror image 310. As the mirror image 310 moves upwards, the user interface 110 may also move upwards on the mobile device 108.

In one embodiment, all of the data may be downloaded at once. In one embodiment, portions of the data may be downloaded. Downloading all of the data may improve the user experience with the mirror image 310, but may result in longer wait times to initialize the mirror image 310. Downloading a portion of the data may allow the mirror image 310 to be initialized more quickly, but may increase latency when the user attempts navigate the mirror image 310.

In one embodiment, when the mobile device 108 transmits all of the information and/or data associated with the user interface 110 of the third-party application, the MFD 102 may have all of the data necessary to recreate the mirror image 310. As a user requests to scroll up or down as indicated by arrows 322 and 324, respectively, the MFD 102 may immediately modify the content shown in the mirror image 310 in accordance with the data that is downloaded.

In one embodiment, when a portion of the information and/or data associated with the user interface 110 of the third-party application is transmitted, the data associated with the portion that is currently displayed in the user interface 110 on the mobile device 108 may be transmitted. If the user attempts to navigate on the mirror image 310 (e.g., scroll up or down to look for another document 312) the MFD 102 may transmit a request to the mobile device 108 over the wireless connection 116. In response, the mobile device 108 may transmit additional data associated with requested portions of the user interface 110. The MFD 102 may receive the additional data and translate the additional data to be shown in the mirror image 310.

In one embodiment, data associated with the user interface 110 that is above or below what is currently shown on the display of the mobile device 108 may also be downloaded and buffered at the MFD 102. Thus, when a user attempts to scroll up on the mirror image 310, the MFD 102 may have the data to create the content in the mirror image 310 quickly. The MFD 102 may then request to download additional data associated with portions of the user interface 110 that are further above the portion that is shown in the mirror image 310.

In one embodiment, the MFD 102 may determine whether to download all of the data associated with the user interface 110 or download portions based on a data size threshold. The data size threshold may be user defined (e.g., 1 gigabyte (GB), 100 GBs, and the like). For example, if the third-party application is a messaging application with a scrolling chat window and a particular conversation is relatively long with large amounts of files, the size of the data associated with the user interface 110 for a particular conversation may be very large (e.g., over 10 GBs). As a result, attempting to download all of the data may take a relatively long time (e.g., several minutes). The data size threshold may be 1 GB. Since the data size of the user interface for the entire conversation is over 1 GB, data associated with portions of the user interface 110 may be downloaded to allow the mirror image 310 to be generated quickly. Additional data associated with the user interface 110 may be downloaded in the background or received as the user navigates the mirror image 310, as described above.

In one embodiment, the data associated with the document 112 may be transmitted to the MFD 102. The data may include a copy of the file to open the document 112 on the MFD 102. In one embodiment, the data associated with the document 112 may be a pointer to a location in the DB 154 that stores the document 112. For example, to save memory on the mobile device 108, when a user transmits a document in the third-party application, the icon that shows the document 112 may be a pointer or a compressed file of the full version of the document 112. The third-party application service provider may store a full version of the document 112 in the DB 154. As a result, when a user opens the document 112, the action may actually send a request for a document 112 to the AS 152. In response, the AS 152 may find the document 112 in the DB 154 and transmit the document 112 to the MFD 102 for viewing and/or editing.

As a result, if the data associated with the document 112 in the user interface 110 is a pointer to a location in the DB 154, then when a user selects the document 312, the MFD 102 may send a request to the AS 152 to obtain the document 154. In one embodiment, the third-party application may provide log-in credentials to the MFD when the wireless connection 116 is established. Thus, the MFD 102 may provide the log-in credentials to the AS 152 when a request is transmitted for the document 312 that is selected to be printed in an embodiment where the document 112 in the user interface 110 does not include the entire file.

As described above, after the user selects the document 312 in the mirror image 310, the user may modify one or more parameters 320 for printing the document 312. After the parameters 320 are selected, the user may select the print button 318 to print the document 312 directly from the MFD 102. Notably, no commands were issued or options to print were selected on the user interface 110 shown on the mobile device 108. Rather, once the mobile device 108 is connected to the MFD 102 via the wireless connection 116, the user may select the document 312 and may manipulate the document 312 directly on the MFD 102.

Figure 4:
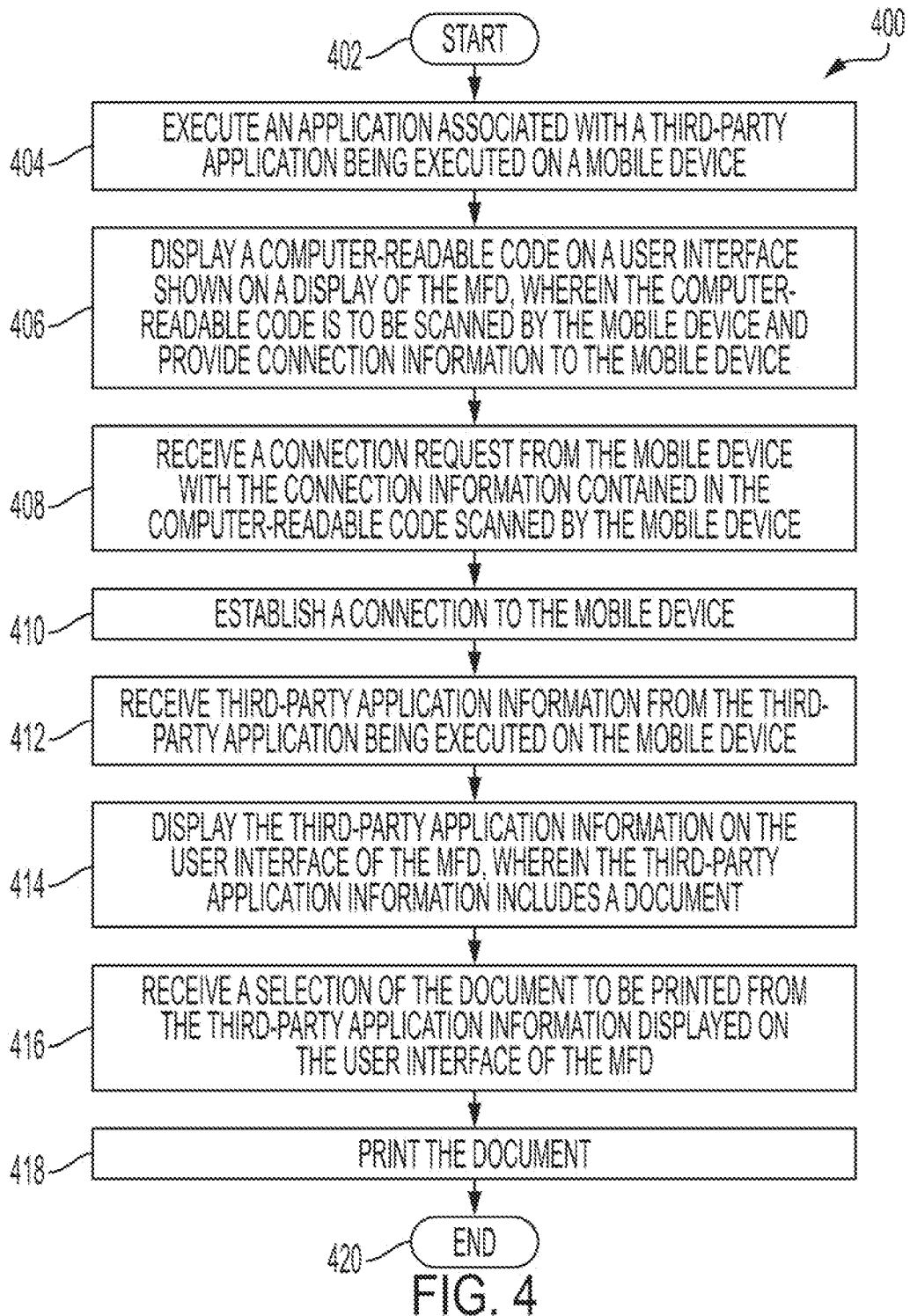
FIG. 4 illustrates a flow chart for a method of printing a document in a third-party application from an MFD of the present disclosure.

FIG. 4 illustrates a flow chart of an example method 400 for printing a document in a third-party application from an MFD of the present disclosure. In one embodiment, the method 400 may be performed by the MFD 102 or by an apparatus such as the apparatus 500 illustrated in FIG. 5 and discussed below.

In one embodiment, the method 400 begins at block 402. At block 404, the method 400 executes an application associated with a third-party application being executed on a mobile device. In one embodiment, the third-party application may be a messaging or a chat application. The messaging application may include a scrolling interface where a conversation may be kept between two or more users. The messaging application may allow users to exchange external files and/or documents (e.g., portable document files, word processing files, image files, and the like). An entire copy of the document may be downloaded to the mobile device when transmitted via the messaging application, or a pointer to a copy of the document stored on a server of a service provider of the third-party application may be transmitted.

At block 406, the method 400 displays a computer-readable code on a user interface shown on a display of the MFD, wherein the computer-readable code is to be scanned by the mobile device and provide connection information to the mobile device. For example, a user may want to connect the mobile device to the MFD to select and print a document in the third-party application. The user may select an EIP application associated with the third-party application that is downloaded on the MFD. Different EIP applications may be written and stored on the MFD that are associated with different third-party applications that may include documents or files that a user may want to print on the MFD.

When the application is selected on the MFD, the application may generate a computer-readable code that is shown on the display of the MFD. The computer-readable code may be a QR code, a bar code, or any other type of symbol that can be read by the mobile device.

In one embodiment, the computer-readable code may include connection information that can be used by the mobile device to establish a wireless connection to the MFD. The wireless connection may be a local wireless connection such as a WiFi connection, a Bluetooth connection, and the like. The connection information comprises a wireless connection identifier used by the MFD and a security password to connect to a wireless network associated with the wireless connection identifier.

At block 408, the method 400 receives a connection request from the mobile device with the connection information contained in the computer-readable code scanned by the mobile device. In one embodiment, the mobile device may process the scanned computer-readable code to obtain the connection information. The mobile device may then send a request to the MFD to establish the wireless connection with the connection information contained in the computer-readable code.

At block 410, the method 400 establishes a connection to the mobile device. As noted above, the connection may be a wireless connection such as a WiFi connection, a Bluetooth connection, and the like.

At block 412, the method 400 receives third-party application information from the third-party application being executed on the mobile device. In one embodiment, the third-party application information may be user interface information and associated data displayed in a user interface of the third-party application being executed on the mobile device. The user interface may be a scrolling chat window with another user that includes a document. The user interface information may include information associated with content displayed within the user interface, a resolution and size of the display of the mobile device, a size of icons or graphics displayed in the user interface, a color of icons or graphics displayed in the user interface, available commands to navigate the user interface, and the like. The associated data may be data associated with at least one document that is contained within the user interface.

In one embodiment, all of the third-party application information associated with the user interface may be downloaded. In one embodiment, portions of the third-party application information associated with the user interface may be downloaded.

At block 414, the method 400 displays the third-party application information on the user interface of the MFD, wherein the third-party application information includes a document. In one embodiment, the third-party application may be displayed on the MFD as a mirror image of the user interface that is currently shown on the mobile device. In one embodiment, the application associated with the third-party application that is executed on the MFD may convert the third-party application information (e.g., the user interface information and associated data) to be compatible with the user interface and/or display of the MFD. For example, the application may modify the images, icons, text, and/or graphics to be compatible with a size and/or resolution of the display of the MFD. In addition, the touch screen of the MFD may be less sophisticated than the touch screen of the mobile device. Thus, some touch inputs may be converted into selected button icons in the user interface of the MFD.

In one embodiment, the user may navigate the mirror image to find a document. Navigation commands on the mirror image may be shown on the user interface shown on the mobile device. In other words, as a user scrolls down in a chat window of the third-party application, the user interface on the mobile device may also scroll down.

In one embodiment, if portions of the third-party application information were downloaded in block 412, then the MFD may request additional user interface information and associated data in response to the navigation command. The additional user interface information may be received and processed by the application executed on the MFD. The MFD may then generate the mirror image of portions of the user interface above the currently shown portion based on the additional user interface information that is received.

At block 416, the method 400 receives a selection of the document to be printed from the third-party application information displayed on the user interface of the MFD. After the document is selected in the mirror image of the user interface shown on the MFD, the user may modify print parameters for the document directly from the user interface of the MFD. For example, the user may select a number of copies, shrink or enlarge the image, select a type of paper, select an orientation, select whether the document should be printed one-sided or two-sided, and so forth. After the desired parameters are selected, the user may select a print option directly on the user interface of the MFD.

At block 418, the method 400 prints the document. The document may be printed directly from the MFD. After the document is printed, blocks 412 to 418 may be repeated to select other documents from the user interface of the third-party application to be printed directly from the MFD.

After the user has completed printing the desired documents, the user may select to break the connection between the MFD and the mobile device. The selection may be made from the user interface of the MFD or the user interface of the mobile device.

In one embodiment, after the connection is terminated, the EIP application executed on the MFD may remove any data locally on the MFD that was temporarily stored and received from a database or application server of the third-party application service provider. At block 420, the method 400 ends.

Figure 5:
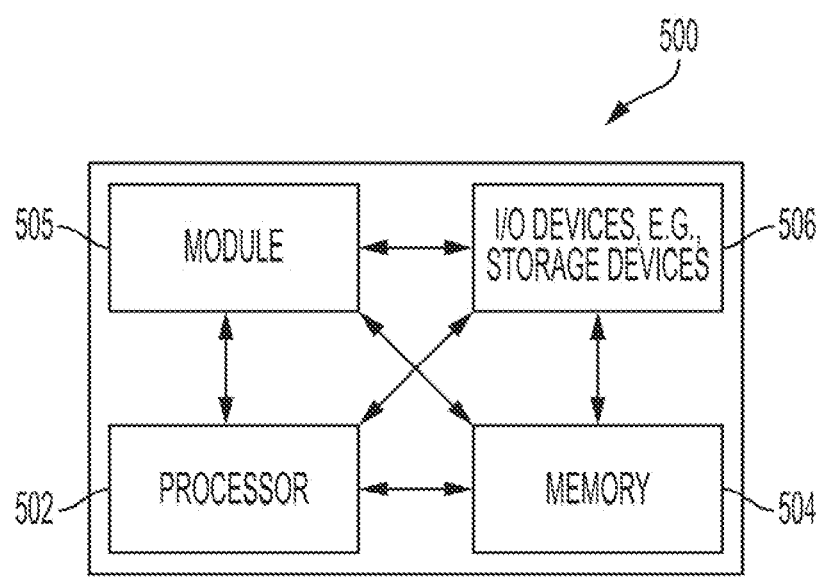
FIG. 5 illustrates a high-level block diagram of an example computer suitable for use in performing the functions described herein.

FIG. 5 depicts a high-level block diagram of a computer that is dedicated to perform the functions described herein. As depicted in FIG. 5, the computer 500 comprises one or more hardware processor elements 502 (e.g., a central processing unit (CPU), a microprocessor, or a multi-core processor), a memory 504, e.g., random access memory (RAM) and/or read only memory (ROM), a module 505 for printing a document in a third-party application from an MFD, and various input/output devices 506 (e.g., storage devices, including but not limited to, a tape drive, a floppy drive, a hard disk drive or a compact disk drive, a receiver, a transmitter, a speaker, a display, a speech synthesizer, an output port, an input port and a user input device (such as a keyboard, a keypad, a mouse, a microphone and the like)). Although only one processor element is shown, it should be noted that the computer may employ a plurality of processor elements.

It should be noted that the present disclosure can be implemented in software and/or in a combination of software and hardware, e.g., using application specific integrated circuits (ASIC), a programmable logic array (PLA), including a field-programmable gate array (FPGA), or a state machine deployed on a hardware device, a computer or any other hardware equivalents, e.g., computer readable instructions pertaining to the method(s) discussed above can be used to configure a hardware processor to perform the steps, functions and/or operations of the above disclosed methods. In one embodiment, instructions and data for the present module or process 505 for printing a document in a third-party application from an MFD (e.g., a software program comprising computer-executable instructions) can be loaded into memory 504 and executed by hardware processor element 502 to implement the steps, functions or operations as discussed above. Furthermore, when a hardware processor executes instructions to perform "operations," this could include the hardware processor performing the operations directly and/or facilitating, directing, or cooperating with another hardware device or component (e.g., a co-processor and the like) to perform the operations.

The processor executing the computer readable or software instructions relating to the above described method(s) can be perceived as a programmed processor or a specialized processor. As such, the present module 505 for printing a document in a third-party application from an MFD (including associated data structures) of the present disclosure can be stored on a tangible or physical (broadly non-transitory) computer-readable storage device or medium, e.g., volatile memory, non-volatile memory, ROM memory, RAM memory, magnetic or optical drive, device or diskette and the like. More specifically, the computer-readable storage device may comprise any physical devices that provide the ability to store information such as data and/or instructions to be accessed by a processor or a computing device such as a computer or an application server.

It will be appreciated that variants of the above-disclosed and other features and functions, or alternatives thereof, may be combined into many other different systems or applications. Various presently unforeseen or unanticipated alternatives, modifications, variations, or improvements therein may be subsequently made by those skilled in the art which are also intended to be encompassed by the following claims.

What is claimed is:

1. A method, comprising:
   executing, by a processor of a multi-function device (MFD), an application associated with a third-party application being executed on a mobile device;
   displaying, by the processor, a computer-readable code on a user interface shown on a display of the MFD, wherein the computer-readable code is to be scanned by the mobile device and to provide connection information to the mobile device;
   receiving, by the processor, a connection request from the mobile device with the connection information contained in the computer-readable code scanned by the mobile device;
   establishing, by the processor, a connection to the mobile device;
   receiving, by the processor, third-party application information from the third-party application being executed on the mobile device, wherein the third-party application information comprises user interface information and associated data displayed in a user interface of the third-party application being executed on the mobile device, wherein the third-party application information that is received is limited to data associated with the user interface of the third-party application that is currently shown on a display of the mobile device;
   displaying, by the processor, the third-party application information on the user interface of the MFD, wherein the third-party application information includes a document, wherein displaying the third-party application information on the user interface of the MFD comprises:
      displaying, by the processor, a mirror image of a user interface of the third-party application being executed on the mobile device based on the user interface information and associated data;
   receiving, by the processor, a request to scroll the mirror image of the user interface on the display of the MFD;
   transmitting, by the processor, a request for additional user interface information and associated data in the user interface of the third-party application being executed on the mobile device in a direction associated with the request to scroll;
   receiving, by the processor, the additional user interface information and associated data;
   processing, by the processor, the additional user interface information and associated data in the application executed by the MFD to display the additional user interface information and associated data in the mirror image of the user interface as the mirror image of the user interface is moved in the direction associated with the request to scroll;
   receiving, by the processor, a selection of the document to be printed from the third-party application information displayed on the user interface of the MFD; and
   printing, by the processor, the document.

2. The method of claim 1, wherein the computer-readable code comprises a quick response (QR) code.

3. The method of claim 1, wherein the connection information comprises a wireless connection identifier used by the MFD and a security password to connect to a wireless network associated with the wireless connection identifier.

4. The method of claim 1, wherein the application associated with the third-party application comprises an extensible interface platform (EIP) application.

5. The method of claim 1, wherein navigation commands in the mirror image of the user interface of the third-party application on the user interface of the MFD is shown on the user interface of the third-party application shown on a display of the mobile device.

6. The method of claim 1, wherein the user interface of the third-party application comprises a scrolling chat window with another user, and wherein the scrolling chat window includes the document.

7. The method of claim 1, wherein the third-party application information that is received comprises a download of all data associated with the user interface of the third-party application being executed on the mobile device.

8. The method of claim 1, wherein the application executed by the MFD converts the user interface information and associated data to be compatible with a user interface of the MFD based on display properties of a display of the MFD.

9. The method of claim 1, further comprising:
receiving, by the processor, a selection of one or more print parameter changes for the document that is selected via the user interface of the MFD; and
modifying, by the processor, a printer description language of the document in accordance with the one or more print parameter changes that are received.

10. A multi-function device (MFD), comprising:
a processor; and
a non-transitory computer-readable medium storing a plurality of instructions, which when executed by the processor, causes the processor to perform operations, comprising:
executing an application associated with a third-party application being executed on a mobile device;
displaying a computer-readable code on a user interface shown on a display of the MFD, wherein the computer-readable code is to be scanned by the mobile device and to provide connection information to the mobile device;
receiving a connection request from the mobile device with the connection information contained in the computer-readable code scanned by the mobile device;
establishing a connection to the mobile device;
receiving third-party application information from the third-party application being executed on the mobile device, wherein the third-party application information comprises user interface information and associated data displayed in a user interface of the third-party application being executed on the mobile device, wherein the third-party application information that is received is limited to data associated with the user interface of the third-party application that is currently shown on a display of the mobile device;
displaying the third-party application information on the user interface of the MFD, wherein the third-party application information includes a document, wherein displaying the third-party application information on the user interface of the MFD comprises:
displaying a mirror image of a user interface of the third-party application being executed on the mobile device based on the user interface information and associated data;
receiving a request to scroll the mirror image of the user interface on the display of the MFD;
transmitting a request for additional user interface information and associated data in the user interface of the third-party application being executed on the mobile device in a direction associated with the request to scroll;
receiving the additional user interface information and associated data;
processing the additional user interface information and associated data in the application executed by the MFD to display the additional user interface information and associated data in the mirror image of the user interface as the mirror image of the user interface is moved in the direction associated with the request to scroll;
receiving a selection of the document to be printed from the third-party application information displayed on the user interface of the MFD; and
printing the document.

11. The MFD of claim 10, wherein the computer-readable code comprises a quick response (QR) code.

12. The MFD of claim 10, wherein the application executed by the MFD converts the user interface information and associated data to be compatible with a user interface of the MFD based on display properties of a display of the MFD.

13. The MFD of claim 10, further comprising:
receiving a selection of one or more print parameter changes for the document that is selected via the user interface of the MFD;
modifying a printer description language of the document in accordance with the one or more print parameter changes that are received.

* * * * *